United States Patent Office 2,913,331
Patented Nov. 17, 1959

2,913,331

NICKEL ORE REDUCTION PROCESS USING ASPHALT ADDITIVE

John G. Dean, Wilton, Conn., assignor to the United States of America as represented by the Administrator of the General Services Administration No Drawing. Application April 15, 1958
Serial No. 728,751

1 Claim. (Cl. 75—7)

This invention relates to the recovery of nickel, and also cobalt if the same be present, from mineral ores containing these metals. More particularly it relates to a process of treating nickeliferous laterite, serpentine or garnierite type minerals whereby a high yield of nickel may be obtained subsequently therefrom by ammoniacal leaching, the process being especially adapted to those ores having a relatively low iron content of not more than 37 percent and up to about 3 percent nickel which cannot be treated economically by the conventional processes ordinarily applied to other nickel ores.

The process involves a thermal reduction step wherein the nickel ore is mixed with a Cuban asphalt additive and heated under certain specific conditions which helps to convert substantially all of the nickel to a form capable of being extracted by leaching with ammoniacal solutions.

A prior art process is known wherein nickel is extracted from relatively low iron content nickeliferous serpentine or garnierite type minerals by mixing such minerals with nickeliferous limonite ores which have a relatively high iron content and then heating the same at high temperatures in the presence of a reducing gas, and that the products obtained may be treated with ammoniacal solutions to leach out the nickel, and the cobalt if present. Whereas this process apparently leads to a very substantial recovery of the nickel in both the serpentine and limonite ores when treated together, this is only because the limonite is susceptible to very high nickel extraction so that the average extraction is high even though the recovery of the contained nickel in the serpentine or garnierite ores is extremely low. This process is therefore quite ineffective for securing a high nickel recovery from serpentine or garnierite type minerals or other nickeliferous ores having a relatively low iron content when treated alone.

There are many large deposits, especially in Cuba, of nickeliferous serpentine and garnierite type ores and other low iron content nickeliferous ores which are not in such close proximity to nickeliferous limonite ores as to make it commercially practical to mine the former for use in the processes known in the prior art. As a result, these large deposits are not being mined at present and an important potential source of nickel, which is a strategic metal perennially in short supply, is being lost to industry and the military.

It is now believed that the low nickel yield in such prior processes when applied to low iron content nickeliferous ores is in part due to inefficiency in the reduction step wherein the heating procedure has had the effect of rendering a portion of the nickel content immune to reduction to such a state as to be leachable in an ammoniacal solution. The reason for this is at present unknown but it remains a fact that the prior art processes are able to extract little more than 50 percent of the nickel in those of such ores having an iron content of 8 percent or less. Where the iron content of such ores is less than 37 percent, the nickel extraction while improved is still so low as to be commercially marginal.

The present invention contemplates subjecting low iron content nickeliferous laterite, serpentine or garnierite type ores to heating in contact with small quantities of a relatively cheap readily available additive in a solid form. Specifically, this additive comprises an asphalt found locally in Cuba in relative abundance but any asphalt having a carbon, hydrogen and sulfur content will be satisfactory for increasing the yield of nickel from the ore over what has heretofore been obtained.

An object of the present invention is to provide a reduction process whereby the quantity of nickel recoverable from certain nickeliferous ores may be materially increased by contacting such ores with a small quantity of an inexpensive and abundant additive during the heating phase of the reduction process.

Another object is the provision of a reduction process for low iron content nickeliferous ores which comprises contacting such ores during reduction with an asphalt additive.

A final object of the invention is to provide a process for heating to a reducing temperature nickeliferous laterite, serpentine or garnierite type minerals in contact with a relatively small quantity of asphalt whereby to materially increase the amount of metallic nickel formed which is amenable to recovery by leaching in an ammoniacal solution.

Other objects and many of the attendant advantages of this invention will be readily appreciated as the same becomes better understood by reference to the following detailed description.

In carrying out the reduction step of the present invention, in a vertical multiple hearth furnace for example, the nickeliferous laterite, serpentine or garnierite type mineral containing nickel, some iron and usually cobalt, such as is found in Cuba in considerable amounts, is dried to reduce substantially the moisture content, is ground to produce a finely divided mass, and is fed in at the top of the furnace so as to pass downwardly over the multiple hearths. Combustion gases are introduced at points throughout the furnace and cause the ore at the top of the furnace to be preheated to a temperature of about 600° C. and then to be gradually heated to a final temperature between 700° C. and 850° C. as the ore slowly progresses downwardly through the furnace. In accordance with the novel process of the present invention, a small percentage of Cuban asphalt is mixed with the ore either by grinding simultaneously therewith or by introducing the ground Cuban asphalt at some lower hearth in the furnace where under some conditions this has been found to be most effective.

If 4 percent or less asphalt is mixed with the ore, it will be necessary to introduce producer gases into the furnace at a level below which the combustion gases are introduced so as to furnish a reducing atmosphere whereby the nickel in the heated ore will be reduced to metallic nickel. However, when about 15 percent asphalt is mixed with the ore, it has been found that the introduction of producer gases into the furnace may be eliminated as the constituents of the Cuban asphalt are such as to produce reduction of the ore when supplied in sufficient quantity.

Good results are obtained when the heating is accomplished in between one and two hours using a producer gas, in those instances when 4 percent or less of asphalt is admixed with the ores, containing approximately 50 percent nitrogen, 12.5 percent carbon dioxide, 12.5 percent carbon monoxide, 12.5 percent water in the form of vapor, and 12.5 percent hydrogen. However, successful results can be obtained with other proportions of these gases.

Because Cuban asphalt is relatively cheap and abundant, its use in the small quantities described herein will not unduly raise the cost of the process to the point where it would be uneconomic. The process has been found to be effective when anywhere from 0.5 to 4.0 percent asphalt has ben ground and mixed with the ground ore before furnacing in the presence of reducing gases. Likewise, where no reducing gases are used, the mixing of 15 percent ground asphalt with the ground ore produces excellent results but the process is not necessarily restricted to this exact percentage as substantial variations therefrom will also produce acceptable results.

The use of Cuban asphalt as an additive in furnacing Cuban low iron content nickeliferous ores of various types has been carried out without considerable success. Ores that have ben tested include a garnierite type material containing only 5.4 percent iron, a serpentine fraction containing 8 percent iron, a serpentine fraction containing 25.3 percent iron, and a lateritic ore known in Cuba as Romona ore after the name of the mining claim in which it is found and which contains 30–37 percent iron. This latter ore is considered a low iron ore when compared with nickeliferous limonite which contains well over 40 percent iron and which responds to reduction without the use of additives to give a nickel recovery of over 80% of the contained nickel when leached in an ammoniacal solution.

The following table shows a number of examples of the effect of a Cuban asphalt additive on nickel extraction from low iron content nickeliferous ores for different maximum reduction temperatures with or without the presence of reducing gases:

| Ore | Max. Temp., °C. | Reducing Gas | Iron, Percent | Asphalt Added, Percent | Extraction, Percent Ni |
|---|---|---|---|---|---|
| Serpentine | 700 | Yes | 8 | 0 | 50.0 |
|  |  | Yes | 8 | 3 | 62.4 |
| Do | 750 | Yes | 8 | 0 | 50.0 |
|  |  | Yes | 8 | 3 | 64.6 |
| Do | 800 | Yes | 8 | 0 | 56.4 |
|  |  | Yes | 8 | 3 | 72.4 |
| Do | 700 | Yes | 25.3 | 0 | 66.9 |
|  |  | Yes | 25.3 | 3 | 67.8 |
| Do | 750 | Yes | 25.3 | 0 | 69.8 |
|  |  | Yes | 25.3 | 3 | 74.2 |
| Do | 800 | Yes | 25.3 | 0 | 70.1 |
|  |  | Yes | 25.3 | 3 | 77.0 |
| Ramona | 700 | Yes | 30.8 | 0 | 80 |
|  |  | Yes | 30.8 | 4 | 85 |
| Do | 750 | Yes | 30.8 | 0 | 81 |
|  |  | Yes | 30.8 | 4 | 88 |
| Do | 800 | Yes | 30.8 | 0 | 80 |
|  |  | Yes | 30.8 | 4 | 89 |
| Garnierite | 800 | Yes | 5.4 | 0 | 57.0 |
|  |  | No | 5.4 | 15 | 70.0 |
| Do | 850 | Yes | 5.4 | 0 | 59.0 |
|  |  | No | 5.4 | 15 | 78.8 |

From the foregoing table, it can readily be seen that the use of an asphalt additive in the reduction of low iron content nickeliferous laterite, serpentine and garnierite type minerals has a profound effect on the amount of nickel which can be extracted from the reduced ore in an ammoniacal solution. The reasons for the success of this additive are not readily apparent but certain speculations can be made which appear to be valid. An analysis of Cuban asphalt showed the following approximate composition of its major constituents:

| C, percent | $H_2$, percent | S, percent |
|---|---|---|
| 72.5–77.8 | 8.5–8.7 | 5.0–7.7 |

It is therefore probable that the large amounts of carbon, hydrogen and sulfur in the asphalt perform a reducing function. Furthermore, because of their close proximity to the nickeliferous ore with which the asphalt is intimately mixed as by simultaneous grinding, liberation of the reducing gases takes place within the ore bed itself, helping to break down any diffusion barrier created by the escaping water vapor and also allowing exploitation of the water gas reaction, i.e., $C+H_2O=CO+H_2$, within the bed when liberation of water of composition has taken place.

While the table shows a considerable increase in the nickel extraction when Cuban asphalt is employed as an additive to the serpentine and garnierite type ores, the percentage of nickel recovered gives the impression that it is still below what is commercially feasible. However, the amount of contained nickel in these low iron content nickeliferous ores is considerably larger than that contained in Cuban limonite ores so that the increased recovery of the contained nickel by the simple and cheap process disclosed hereinabove renders it economic to proceed with the development of these apparently less desirable deposits of garnierite and serpentine ores.

It should be understood that the present invention is not limited to the exact compounds or proportions thereof described above, but that it extends to all equivalents which will occur to those skilled in the art upon consideration of the claims appended hereto.

Having thus described the invention, what is claimed is:

The process of treating low iron content nickeliferous laterite, serpentine and garnierite type ores to induce high nickel recovery, which comprises mixing with the ores from 0.5 to 4.0 percent of an asphalt additive having the composition comprising C=72.5–77.8%, $H_2$=8.5–8.7% and S=5.0–7.7%, passing reducing gases through the mixture, and heating the mixture at gradually increasing temperatures for from one to two hours in the reducing atmosphere to a final temperature between 600 and 850° C.

References Cited in the file of this patent

UNITED STATES PATENTS 2,478,942    Queneau et al.     Aug. 16, 1949

FOREIGN PATENTS 531,118    Great Britain     Dec. 30, 1940
965,786    France     Feb. 22, 1950